US009014163B2

(12) United States Patent
Jayapalan et al.

(10) Patent No.: US 9,014,163 B2
(45) Date of Patent: Apr. 21, 2015

(54) ENHANCED INFORMATION SERVICES USING DEVICES IN SHORT-RANGE WIRELESS NETWORKS

(71) Applicant: Verizon Patent and Licensing Inc., Basking Ridge, NJ (US)

(72) Inventors: Vijay Jayapalan, San Antonio, TX (US); Manvinder Chopra, Carrollton, TX (US); Sundar Padmanabhan, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 27 days.

(21) Appl. No.: 13/960,928

(22) Filed: Aug. 7, 2013

(65) Prior Publication Data

US 2013/0324188 A1    Dec. 5, 2013

Related U.S. Application Data

(60) Division of application No. 13/485,758, filed on May 31, 2012, now Pat. No. 8,532,031, which is a continuation of application No. 12/506,476, filed on Jul. 21, 2009, now Pat. No. 8,223,694.

(51) Int. Cl.
| | |
|---|---|
| *H04W 4/00* | (2009.01) |
| *H04M 1/66* | (2006.01) |
| *H04M 3/42* | (2006.01) |
| *H04W 88/06* | (2009.01) |
| *H04W 76/00* | (2009.01) |
| *H04W 88/10* | (2009.01) |
| *H04W 76/02* | (2009.01) |
| *H04W 84/10* | (2009.01) |

(52) U.S. Cl.
CPC ............ *H04W 88/06* (2013.01); *H04W 76/002* (2013.01); *H04W 76/02* (2013.01); *H04W 84/10* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 5,699,413 A | 12/1997 | Sridhar | |
| 2003/0161292 A1 | 8/2003 | Silvester | |
| 2006/0234736 A1 | 10/2006 | Lazaro et al. | |
| 2008/0036586 A1 | 2/2008 | Ohki | |
| 2008/0200143 A1 | 8/2008 | Qiu et al. | |
| 2009/0093236 A1 | 4/2009 | Balan et al. | |
| 2009/0197593 A1* | 8/2009 | Farrell et al. | 455/426.1 |
| 2009/0204815 A1 | 8/2009 | Dennis et al. | |
| 2009/0298461 A1* | 12/2009 | O'Reilly | 455/404.2 |
| 2009/0298478 A1 | 12/2009 | Tyhurst et al. | |
| 2009/0320077 A1 | 12/2009 | Gazdzinski | |
| 2010/0011086 A1* | 1/2010 | Fein et al. | 709/216 |
| 2010/0026816 A1 | 2/2010 | Bergstrom et al. | |
| 2010/0131352 A1* | 5/2010 | Malhotra et al. | 705/14.42 |
| 2010/0284390 A1* | 11/2010 | Lee et al. | 370/338 |
| 2011/0165861 A1 | 7/2011 | Wilson et al. | |
| 2011/0201356 A1 | 8/2011 | George | |
| 2011/0207403 A1* | 8/2011 | Kim et al. | 455/41.1 |
| 2011/0302182 A1 | 12/2011 | Crawford | |

* cited by examiner

*Primary Examiner* — Brandon Renner

(57) ABSTRACT

A method is implemented by an access terminal associated with a wireless network. The method includes identifying content stored within a paired device in a short-range wireless network, initiating a voice session, over a wireless carrier network, with an information services provider, and initiating a data session, over the wireless carrier network, with a mobile user content server associated with the information services provider. The method also includes uploading a portion of the content stored within the paired device to the mobile user content server based on the initiated voice connection.

20 Claims, 10 Drawing Sheets

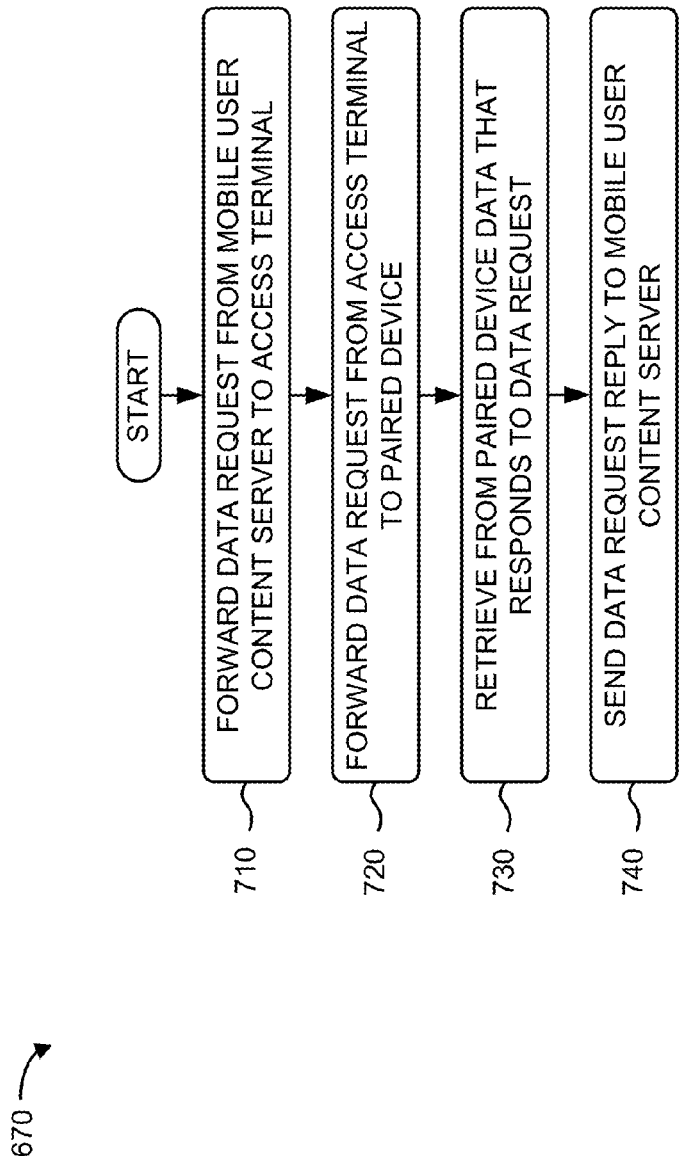

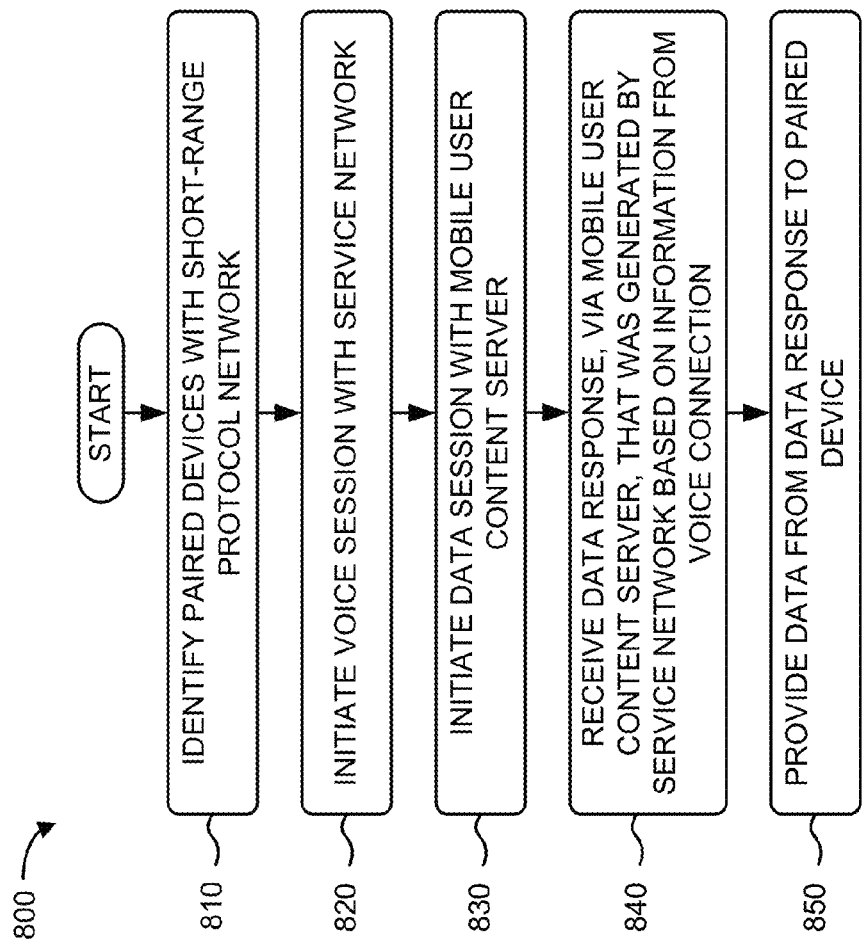

ENHANCED INFORMATION SERVICES USING DEVICES IN SHORT-RANGE WIRELESS NETWORKS

RELATED APPLICATIONS

This application is a divisional of U.S. patent application Ser. No. 13/485,758, filed May 31, 2012, which is a continuation of U.S. patent application Ser. No. 12/506,476, filed Jul. 21, 2009 (now U.S. Pat. No. 8,223,694), which are both incorporated herein by reference.

BACKGROUND INFORMATION

Some current and future cellular phone networks offer extensive geographic coverage for voice and data transmissions using mobile devices that are equipped to operate using one or more telecommunications standards, such as Global System for Mobil Communications (GSM) standards, code division multiple access (CDMA) 2000 standards, Long Term Evolution (LTE) standards, etc. Short-range wireless networks, such as those using Bluetooth™ or Wi-Fi protocols, may provide a convenient way to exchange data between electronic devices over short distances. Some electronic devices may include access to short-range wireless networks, but not to the farther reaching cellular phone networks.

BRIEF DESCRIPTION OF THE DRAWINGS

FIGS. 6 and 7 depict flow charts of an exemplary process for integrating devices in a short-range network with a services network via an access terminal according to implementations described herein; and FIG. 8 depicts a flow chart of another exemplary process for integrating devices in a short-range network with a services network via an access terminal according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide for integration of a device having short-range wireless network capabilities with an information services provider that is accessible over a cellular phone network. An access terminal (e.g., a mobile phone) may be equipped with access capabilities for both short-range networks and cellular wireless networks, so that the access terminal may serve as a gateway to transmit/receive information between the information services provider and the short-range wireless device. A separate mobile user content server may be used to facilitate secure data transfer between the access terminal and the information services provider. When establishing a voice connection with a particular information services provider, the access terminal may also establish a trusted data connection with the mobile user content server to allow the information services provider to access data from and/or provide data to the short-range wireless device. In implementations described herein, the information services provider may use the combination of voice connection with the user of the access terminal and data connection with the short-range wireless device to provide advanced information services.

Figure 1:
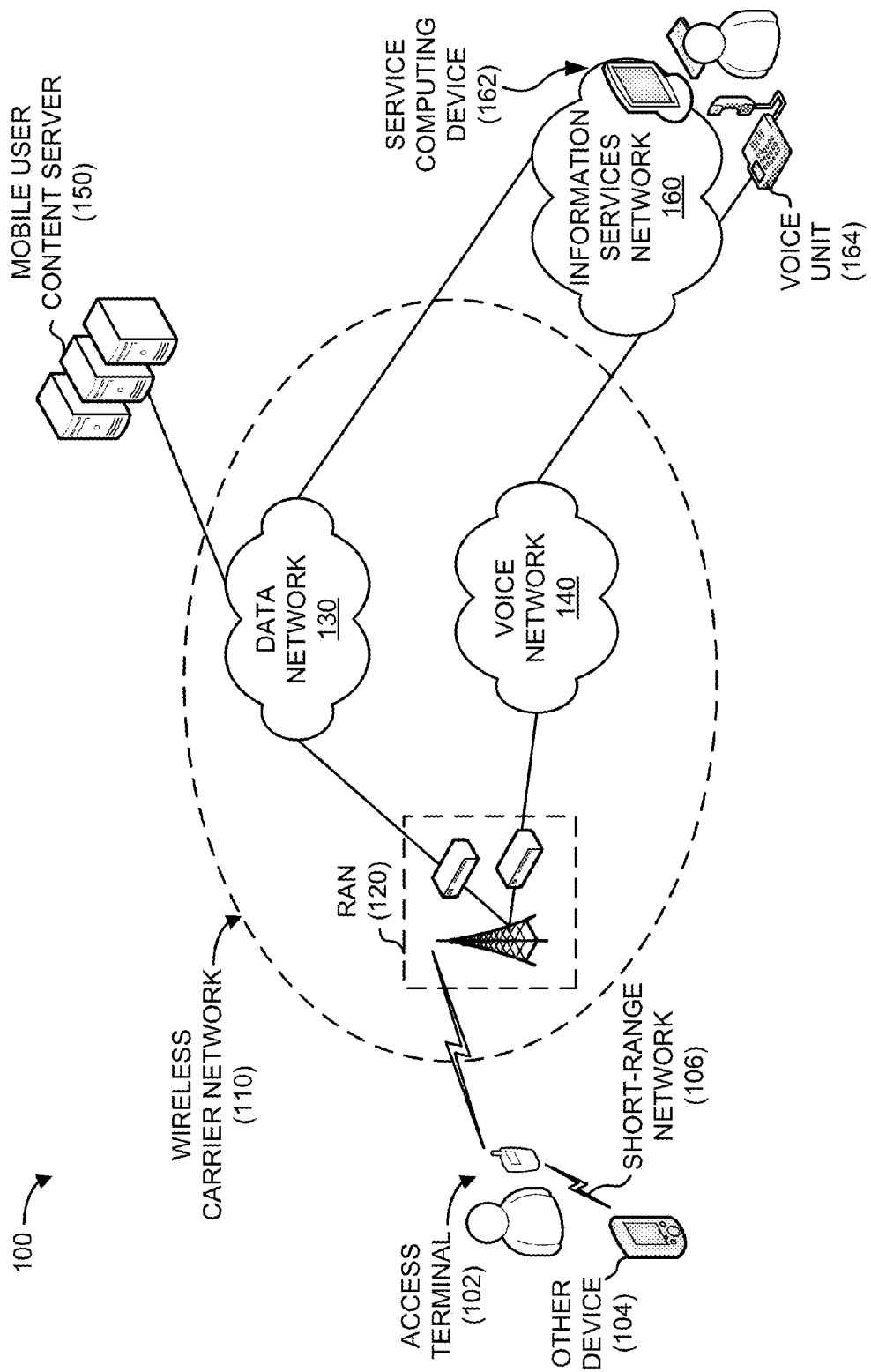
FIG. 1 depicts an exemplary network in which systems and/or methods described herein may be implemented.

FIG. 1 depicts an exemplary network 100 in which concepts described herein may be implemented. As illustrated, network 100 may include an access terminal 102 and one or more other device(s) 104 interconnected by a short-range wireless network 106. Access terminal 102 may be interconnected, via wireless carrier network 110, with one or more mobile user content servers 150 and/or an information services network 160.

Access terminal 102 may include a device capable of transmitting and receiving data (e.g., voice, text, images, and/or multimedia data) over a wireless network. For example, access terminal 102 may include a handheld device, such as a cellular telephone, a personal digital assistant (PDA); a conventional laptop and/or palmtop receiver; and/or or another appliance that includes a radiotelephone transceiver with Mobile Internet Protocol (Mobile IP) capabilities. In one implementation, access terminal 102 may communicate via packet-based or non-packet-based wireless transmissions. Access terminal 102 may also include a device capable of transmitting and receiving data over a short-range wireless network. In implementations herein, access terminal 102 may automatically initiate a data connection with, for example, mobile user content server 150 upon a user initiating a voice connection with device associated with information services network 160.

Other device(s) 104 may each include any type of device that is able to communicate via a short-range wireless network. For example, other device(s) 104 may include any type of device that is capable of transmitting and receiving data to/from access terminal 102. In an exemplary implementation, other device(s) 104 may include a global positioning system (GPS) terminal, a navigation system, a subscription-based vehicle communications system, a multimedia (e.g., audio, video, images, etc.) player, a gaming device, binoculars, a camera, or another device capable of transmitting data over a short-range wireless protocol. In another exemplary implementation, other device(s) 104 may include a desktop computer or other fixed-location computing device. Other device(s) 104 may connect to access terminal 102 via short-range wireless network 106. In one implementation, access terminal 102 and other device(s) 104 may communicate via a protocol for a wireless personal area network (WPAN), such as IEEE 802.15 (e.g., Bluetooth). In another implementation, access terminal 102 and other device(s) 104 may communicate via a protocol for a wireless local area network (WLAN), such as IEEE 802.11 (e.g. Wi-Fi).

Wireless carrier network 110 may include a network that transfers information. Wireless carrier network 110 may include a radio access network (RAN) 120, a data network 130, and/or a voice network 140. Implementations of wireless carrier network 110 may include cellular networks and/or other types of wireless networks, such as ad hoc wireless networks, free-space optical networks, etc. Wireless carrier network 110 may send and/or receive information via packet-based or non-packet-based exchanges. In one implementation, wireless carrier network 110 may be operated by an entity that provides wireless communication services to a customer, such as a user of access terminal 102, as a managed service (e.g., for a monthly fee). Wireless carrier network 110 may send and/or receive encrypted information and/or unencrypted information.

RAN 120 may include a variety of components to facilitate mobile communications, such as antennas, base transceiver stations (BTS), base station controllers (BSC), and/or interfaces for packet data servicing nodes (PDSNs) and/or mobile switching centers (MSCs). Data network 130 may include components necessary to facilitate packet data traffic, including for example, one or more load balancers, gateways, and databases connected by a core infrastructure (not shown). A PDSN may serve as an access gateway to data network 130. Voice network 140 may include elements to facilitate voice traffic and/or SMS traffic through voice network 140, such as an MSC, a home location register (HLR), a signal transfer point (STP), and Signaling System 7 (SS7) links.

Mobile user content server 150 may include one or more server entities, or other types of computation or communication devices, that gather, process, search, and/or provide information in a manner described herein. In one implementation, mobile user content server 150 may be associated with an entity that owns and/or manages wireless carrier network 110 (or a portion of wireless carrier network 110). In one implementation, mobile user content server 150 may establish a data connection with access terminal 102, and may receive from access terminal 102 information associated with other device(s) 104 within short-range network 106.

Information services network 160 may include one or more networks including another wireless network, a satellite network, the Internet, a telephone network, such as the Public Switched Telephone Network (PSTN), a metropolitan area network (MAN), a wide area network (WAN), a local area network (LAN), a mesh network, or another type of network. In an exemplary implementation, network 160 may include a combination of networks and other components (e.g., switches, routers, etc.) for transmitting data to and from service computing device 162. Information services network 160 may also include one or more voice units 164 (e.g., conventional telephone, VoIP system, cellular telephone, etc.) to provide voice connectivity between an operator (e.g., person or automated system) of information services network 160 and a user of access terminal 102. Voice unit 164 may or may not be connected with information services network 160.

Information services network 160 may be used by an information services provider to provide a range of information services to a user of access terminal 102, such as operator services, concierge services, emergency services, etc. These services may be enhanced by access to information in other devices 104 that may be accessible during a voice connection from access terminal 102.

In operation, processes in network 100 may be initiated by a user of access terminal 102 initiating a call to information services network 160 to request information services. Access terminal 102 may establish a voice connection with information services network 160 (e.g., voice unit 164). At about the same time, mobile user content server 150 may receive, from access terminal 102, a request for a data connection and information (e.g., geo-location information, music information, gaming information, etc.) associated with other device(s) 104. Mobile user content server 150 may later receive an information request from a computing device 162 within information services network 160 instructing mobile user content server 150 to provide information from other device(s) 104 to computing device 162. When the request from computing device 162 is received, mobile user content server 150 may verify an information services operator associated with service computing device 162, and may provide the other device(s) 104 information to service computing device 162 when the information services operator is verified.

As a further example of an implementation of network 100, assume information services network 160 is part of an emergency roadside assistance provider and that other device 104 is a GPS device, such as an original equipment manufacturer (OEM) GPS unit for an automobile. Access terminal 102 may be used to initiate a call to the emergency roadside assistance provider. The phone number for the emergency roadside assistance provider can be recognized by access terminal 102 as one for an enhanced information services provider. The initiation of the voice connection could, thus, also trigger access terminal 102 to identify other devices 104 and initiate a data connection with mobile user content server 150 associated with, for example, a provider for the enhanced information services system. An operator at the emergency roadside assistance provider could use the established data connection to request (via mobile user content server 150) information resident within the GPS unit that may assist in providing emergency services.

Although FIG. 1 shows exemplary components of network 100, in other implementations, network 100 may contain fewer, different, differently arranged, or additional, components than depicted in FIG. 1. In still other implementations, one or more components of network 100 may perform one or more other tasks described as being performed by one or more other components of network 100.

Figure 2:
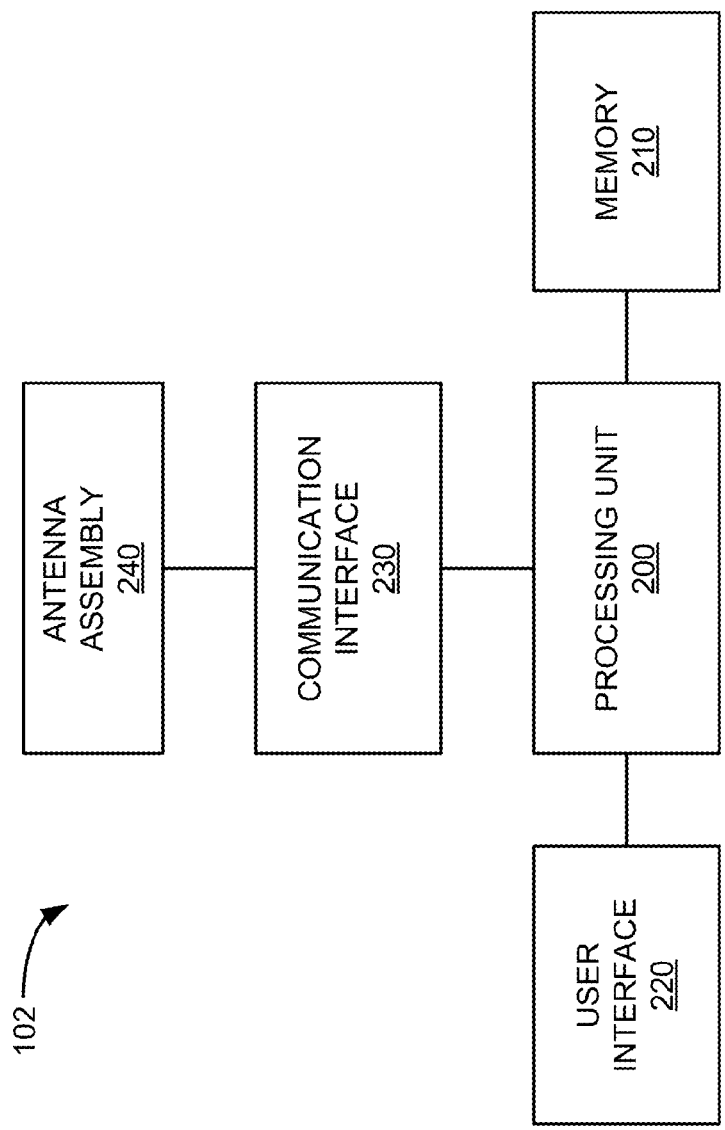
FIG. 2 provides a diagram of exemplary components of an access terminal of FIG. 1.

FIG. 2 is a diagram of exemplary components of access terminal 102. As illustrated, access terminal 102 may include a processing unit 200, memory 210, a user interface 220, a communication interface 230, and/or an antenna assembly 240.

Processing unit 200 may include one or more processors, microprocessors, application specific integrated circuits (ASICs), field programmable gate arrays (FPGAs), or the like. Processing unit 200 may control operation of access terminal 102 and its components. In one implementation, processing unit 200 may control operation of components of access terminal 102 in a manner described herein.

Memory 210 may include a random access memory (RAM), a read-only memory (ROM), and/or another type of memory to store data and instructions that may be used by processing unit 200.

User interface 220 may include mechanisms for inputting information to access terminal 102 and/or for outputting information from access terminal 102. Examples of input and output mechanisms might include buttons (e.g., control buttons, keys of a keypad, a joystick, etc.) or a touch screen interface to permit data and control commands to be input into access terminal 102; a speaker to receive electrical signals and output audio signals; a microphone to receive audio signals and output electrical signals; and/or a display to output visual information (e.g., text input into access terminal 102).

Communication interface 230 may include, for example, a transmitter that may convert baseband signals from processing unit 200 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive RF signals over the air. Antenna assembly 240 may, for example, receive RF signals from communication interface 230 and transmit them over the air, and receive RF signals over the air and provide them to communication interface 230. In one implementation, for example, communication interface 230 may communicate with a network and/or devices connected to a network (e.g., wireless carrier network 110).

As will be described in detail below, access terminal 102 may perform certain operations in response to processing unit 200 executing software instructions of an application contained in a computer-readable medium, such as memory 210. A computer-readable medium may be defined as a physical or logical memory device. A logical memory device may include memory space within a single physical memory device or spread across multiple physical memory devices. The software instructions may be read into memory 210 from another computer-readable medium or from another device via communication interface 230. The software instructions contained in memory 210 may cause processing unit 200 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of access terminal 102, in other implementations, access terminal 102 may contain fewer, different, differently arranged, or additional components than depicted in FIG. 2. In still other implementations, one or more components of access terminal 102 may perform one or more other tasks described as being performed by one or more other components of access terminal 102.

Figure 3:
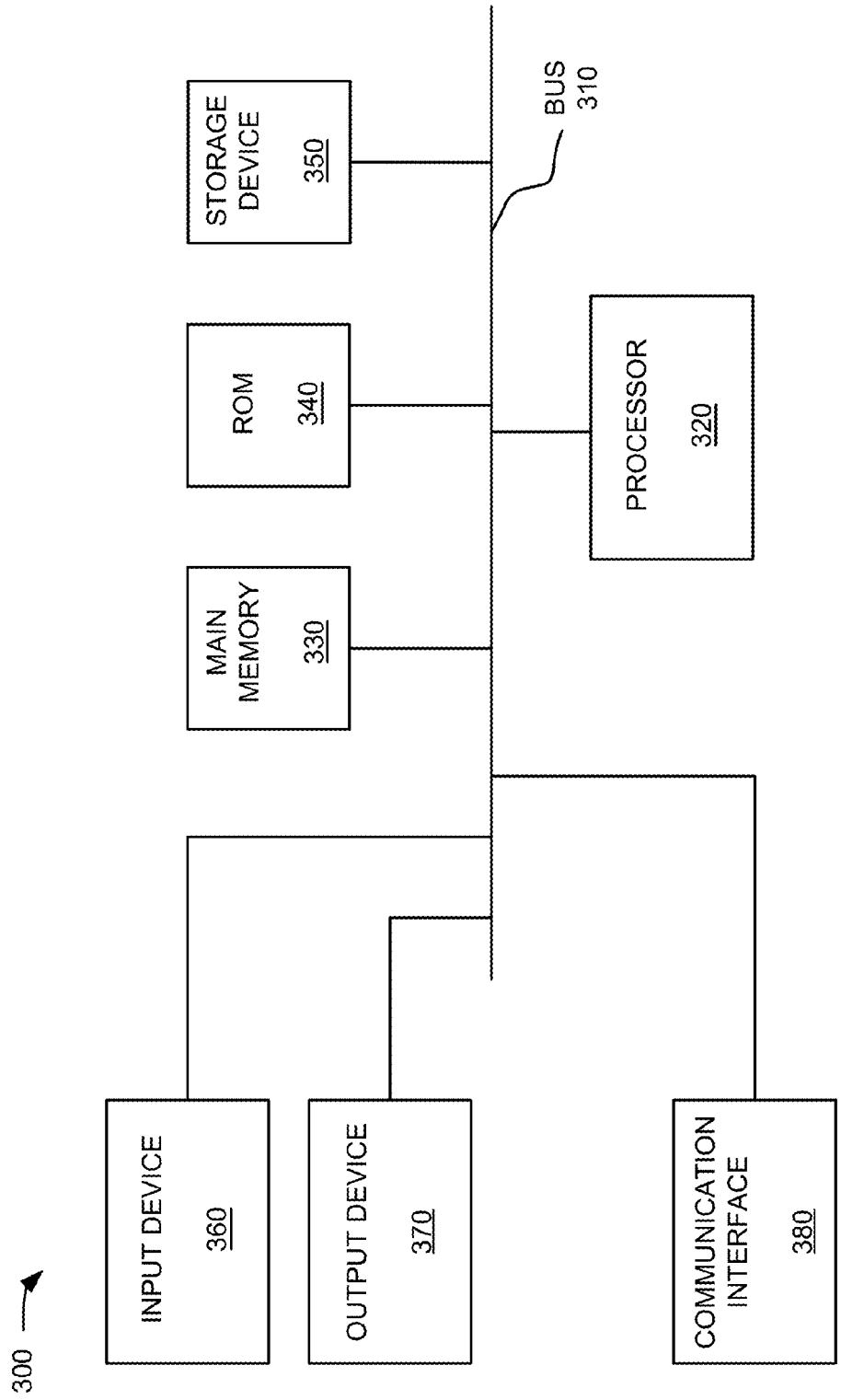
FIG. 3 is an exemplary diagram of a device that may correspond to any of the access terminal, a mobile user content server, and/or a service computing device of FIG. 1.

FIG. 3 depicts a diagram of exemplary components of a device 300 that may correspond to access terminal 102 (e.g., if access terminal 102 is a laptop computer), mobile user content server 150, and/or service computing device 162. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processors that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as wireless carrier network 110 or information services network 160.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
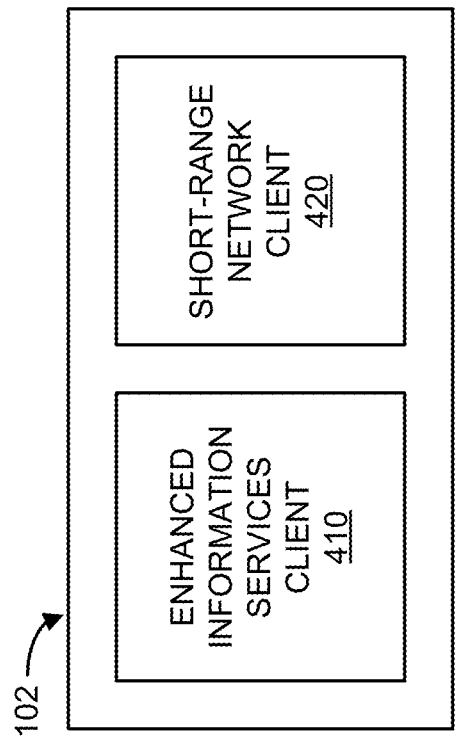
FIG. 4 provides a functional block diagram of the access terminal of FIG. 1.

FIG. 4 provides a functional block diagram of access terminal 102. As shown in FIG. 4, access terminal 102 may include an enhanced information services client 410 and a short-range network client 420.

Enhanced information services client 410 may include hardware or a combination of software and hardware to facilitate enhanced information services within, for example, network 100. Enhanced information services client 410 may store (e.g., in memory 210) records that identify an access number (e.g., phone number) as one associated with an information services provider using enhanced information services. When the access number is called, enhanced information services client 410 may identify a mobile user content server 150 associated with the number and automatically establish a wireless data session with the mobile user content server 150 while the voice call is placed (e.g., using voice network 140) to the information services provider (e.g., at information services network 160). Enhanced information services client 410 may also send and/or receive data associated with one of other devices 104 to mobile user content server 150 via data network 130. Enhanced information services client 410 may further terminate the wireless data session after a particular period of inactivity or within a particular period of time after the corresponding voice session is terminated.

Short-range network client 420 may identify devices (e.g., other devices 104) paired with access terminal 102 under one or more short-range protocols. Short-range network client 420 may also identify information and/or types of information available on other devices 104. In one implementation, short-range network client 420 may receive from enhanced information services client 410 an indication of what type of information is predicted to be associated with a particular access number. Short-range network client 420 may then retrieve information of that type from one or more paired devices.

Although FIG. 4 shows exemplary functional components access terminal 102, in other implementations, access terminal 102 may contain fewer, different, differently arranged, or additional functional components than depicted in FIG. 4. In still other implementations, one or more functional components of access terminal 102 may perform one or more other tasks described as being performed by one or more other functional components of access terminal 102.

Figure 5A:
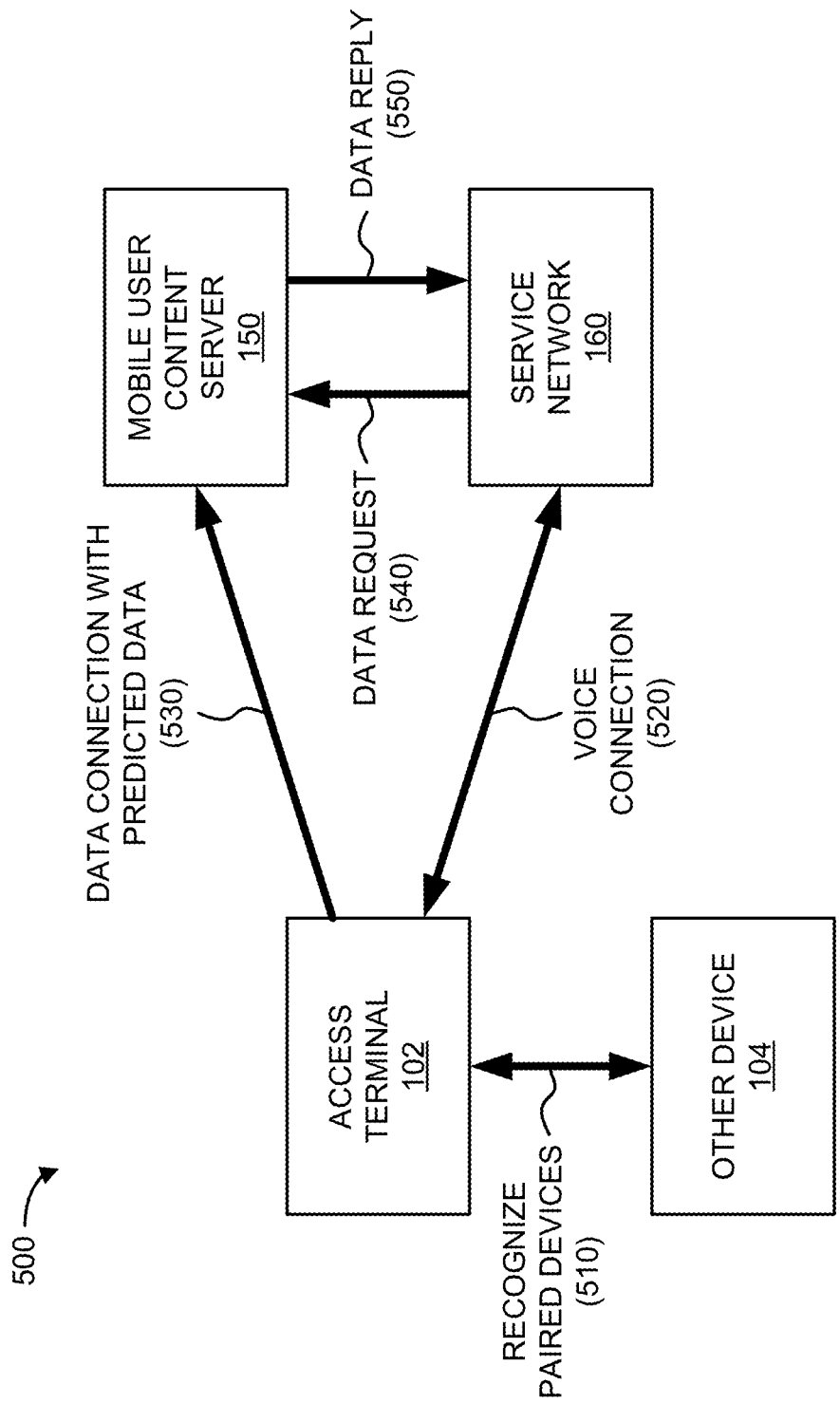
FIGS. 5A-5C illustrate diagrams of exemplary interactions among components of an exemplary portion of the network depicted in FIG. 1.
Figure 5B:
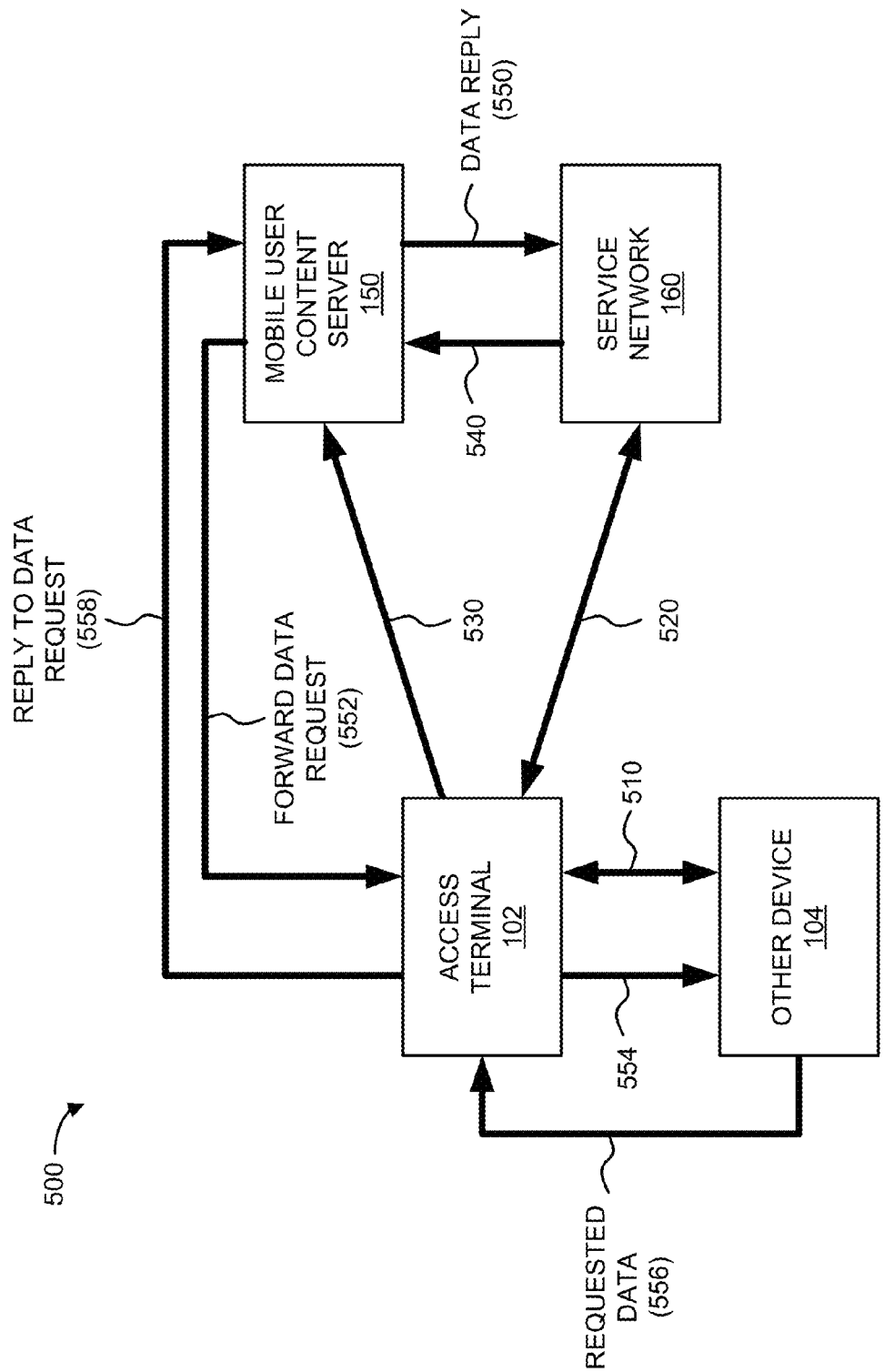
Figure 5C:
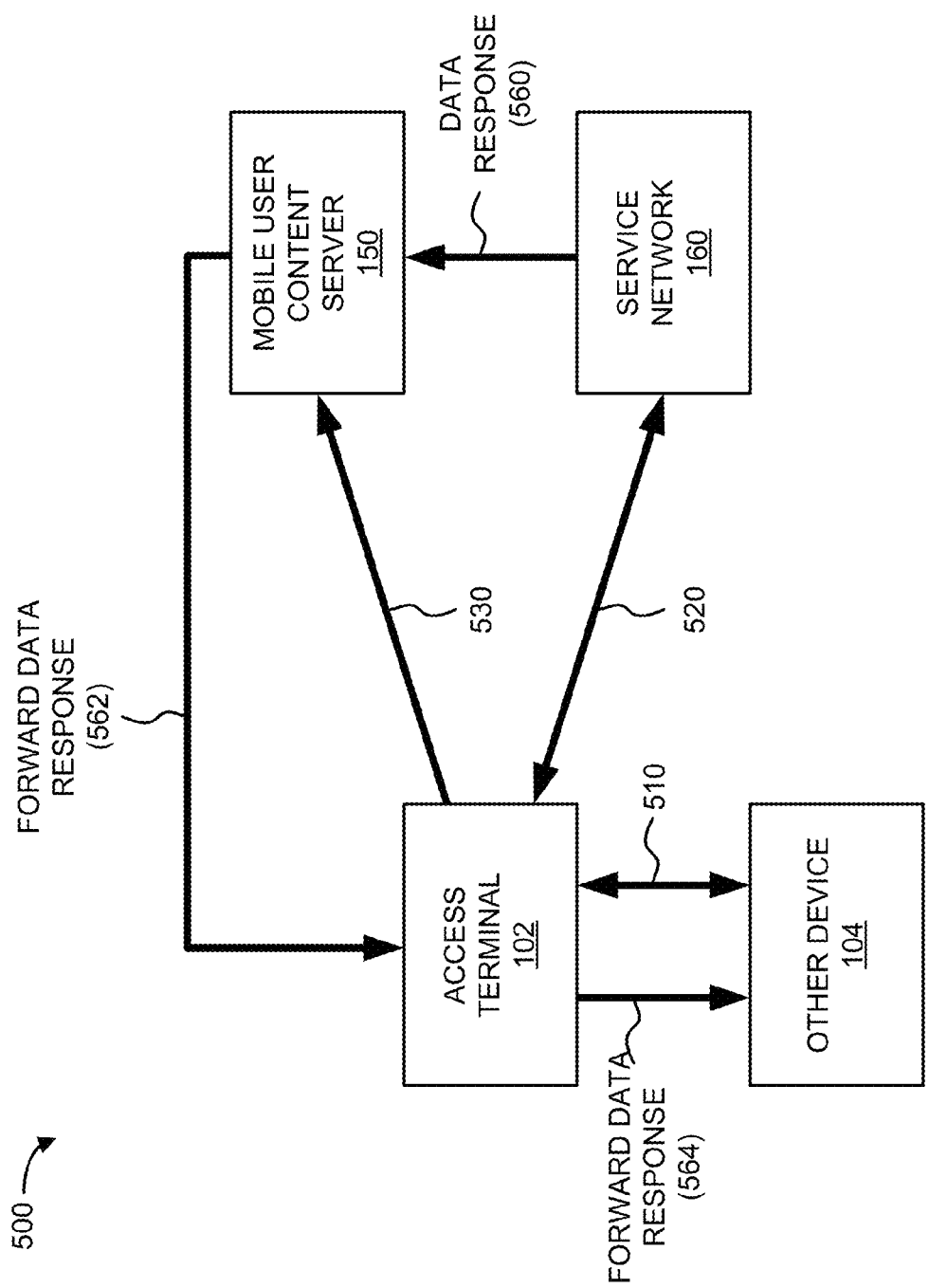

FIGS. 5A-5C illustrate diagrams of exemplary interactions among components of an exemplary portion 500 of the network depicted in FIG. 1. As illustrated, exemplary network portion 500 may include access terminal 102, other device 104, mobile user content server 150, and service computing device 162. Access terminal 102, other device 104, mobile user content server 150, and service computing device 162 may include the features described above in connection with, for example, FIG. 1.

FIG. 5A illustrates a first set of exemplary interactions among components of an exemplary network portion 500. As further shown in FIG. 5A, access terminal 102 may recognize one or more paired devices over a short-range network as shown by reference number 510. For example, access terminal 102 may use Bluetooth protocols to identify other device 104, such as an OEM GPS for an automobile. In another example, access terminal 102 may use a Wi-Fi protocol to identify other device 104, such as a portable media player that includes a Wi-Fi mobile platform. Access terminal 102 and other device 104 may establish a paired relationship, for example, by creating a link key and/or by establishing communications over an encrypted link.

Other device 104 may provide to access terminal 102 a device name, a device class, a list of services, and other technical information associated with other device 104. In one implementation, access terminal 102 may also identify stored data within other device 104, such as position information, planned travel routes, current/available musical selections, current/available games, etc.

Voice connection 520 may include a connection between access terminal 102 and a device within information services network 160 (e.g., service computing device 162 and/or voice unit 164) to permit voice communications. For example, a user of access terminal 102 may place a call to a telephone number associated with information services network 160. The call may be routed (e.g., via voice network 140) to information services network 160, where the call may be subsequently routed to a service computing device 162 and/or voice unit 164 associated with a particular operator or an automated service, such as an interactive voice recognition (IVR) system. Two-way voice communications between access terminal 102 and the device within information services network 160 may be used to identify a need for additional information that may be beneficial to providing services from information services network 160.

Data connection with predicted data 530 may include data from other device 104 that access terminal 102 may send to mobile user content server 150. In one implementation, access terminal 102 may initiate a data connection with mobile user content server 150 and send predicted data 530 via data network 130 during or in advance of establishment of voice connection 520. Predicted data 530 may be determined by access terminal 102 based on, for example, a type of service associated with the telephone number used to establish voice connection 520. In one implementation, predicted data 530 may include location information, route information, a destination address, or other information associated with other device 104. In another implementation, predicted data 530 may include a listing of the type of information available within other device 104, such as music files, games, GPS information, driving routes, etc.

Data request 540 may include a request from a device within information services network 160 (e.g., service computing device 162) to mobile user content server 150 for particular data from other device 104. In one implementation, data request 540 may be sent via data network 130 during or after establishment of voice connection 520. In another implementation, data request 540 may be provided from information services network 160 to mobile user content server 150 via another type of network connection, including or excluding data network 130. Information provided by voice connection 520 may be used to directly or indirectly trigger data request 540. For example, data request 540 may be triggered by an operator or an automated response system (e.g., an interactive voice response system) in conjunction with information services network 160. In one implementation, a request for services from a user of access terminal 102 may be provided via voice connection 520. Information services network 160 (e.g., either an operator or an automated system) may determine that the request for services may require additional information (e.g., location information, route information, destination information, etc.) that can be obtained from other device 104 and provide data request 540 to mobile user content server 150.

Data reply 550 may include a response to data request 540. Mobile content server 150 may review data request 540 and determine if mobile content server 150 has information from other device 104 (e.g., predicted data 530) that is sufficient to provide data reply 550. If so, data reply 550 may be sent from mobile user content server 150 to a device (e.g., service computing device 162) associated with information services network 160. Data reply 550 may include some or all of predicted data 530. For example, data reply 550 may include particular location information, route information, or destination information associated with other device 104 and requested by information services network 160. Data reply 550 may be sent from mobile user content server 150 to information services network 160 using the same network or a different network than used to send data request 540.

As a particular illustration of the interactions shown in FIG. 5A, assume information services network 160 is part of reservation service and that other device 104 is an automobile OEM navigation system. Access terminal 102 may be used to initiate a call to the reservation service and allow a user to interact with an operator of the reservation service. For example, a user may request a restaurant reservation at a particular restaurant or a class or restaurants. A restaurant may be identified by the operator using GPS and route information from the automobile navigation system to identify a restaurant along the projected route. Also, the timing of the reservation may be based on travel times obtained from the automobile navigation system.

FIG. 5B illustrates a second set of exemplary interactions among components of exemplary network portion 500. As shown in FIG. 5B, exemplary network portion 500 may include recognition of paired devices 510, voice connection 520, data connection with predicted data 530, and data request 540 as described above in connection with FIG. 5A. If mobile user content server 150 has not received sufficient information in predicted data 530 to respond to data request 540, additional interactions indicated in FIG. 5B may occur.

Forward data request 552 may send data request 540 from mobile user content server 150 to access terminal 102. In one implementation, forward data request 552 may be sent via data network 130 during or after voice connection 520. Forward data request 552 may include additional headers, encryption, formatting, etc. to support transmission from mobile user content server 150 to access terminal 102 over data network 130.

Access terminal 102 may send forward data request 552 to other device 104, as indicated by reference number 554. In one implementation, forward data request 554 may be sent from access terminal 102 to other device 104 using protocols for short-range network 106. Forward data request 554 may include additional headers, encryption, formatting, etc. to support transmission from access terminal 102 to other device 104 over short-range network 106.

Other device 104 may provide the requested data that was the subject of data request 540 (and subsequently forwarded by forward data requests 552 and 554), as indicated by reference number 556. For example, if the requested data of data request 540 is the destination address of a programmed route in other device 104 (e.g., a GPS device), then other device 104 may retrieve the destination address and forward the address to access terminal 102. Requested data 556 may be sent from other device 104 to access terminal 102 using protocols for short-range network 106 that are the same or different than those used for forward data request 554.

Reply to data request 558 may include data from other device 104 that access terminal 102 may send to mobile user content server 150. In one implementation, reply to data request 558 may be sent via data network 130 during or after voice connection 520. Reply to data request 558 may include requested data 556 from other device 104. In one implementation, reply to data request 558 may include additional headers, encryption, formatting, etc. to support transmission from access terminal 102 to mobile user content server 150 over data network 130.

As described above with respect to FIG. 5A, data reply 550 may include a response to data request 540. Data reply 550 may include some or all of requested data 556 provided via reply to data request 558. For example, data reply 550 may include the destination address of a programmed route in other device 104 that was requested in data request 540.

FIG. 5C illustrates a third set of exemplary interactions among components of exemplary network portion 500. As shown in FIG. 5C, exemplary network portion 500 may include recognition of paired devices 510, voice connection 520, and data connection with predicted data 530 as described above in connection with FIG. 5A. If, based on voice connection 520, information services network 160 determines it has data to provide to other device 104, additional interactions indicated in FIG. 5C may occur.

Data response 560 may include a response to a data request based on voice connection 520. For example, a user of access terminal 102 may communicate (e.g., via voice network 140) with a particular operator or automated service associated with information services network 160. The user of access terminal 102 may indicate a request, such as a request for an address associated with a particular phone number. Resources within or in connection with information services network 160 may be used to identify information necessary to answer the request from the user of access terminal 102. Data response 560 may then be sent from a device associated with information services network 160 (e.g., service computing device 162) to mobile user content server 150.

Forward data response 562 may send data response 560 from mobile user content server 150 to access terminal 102. In one implementation, forward data response 562 may be sent via data network 130 during or after voice connection 520. Forward data response 562 may include additional headers, encryption, formatting, etc. to support transmission from mobile user content server 150 to access terminal 102 over data network 130.

Access terminal 102 may send forward data response 562 to other device 104, as indicated by reference number 564. In one implementation, forward data response 564 may be sent from access terminal 102 to other device 104 using protocols for short-range network 106. Forward data request 564 may include additional headers, encryption, formatting, etc. to support transmission from access terminal 102 to other device 104 over short-range network 106.

As a particular illustration of the interactions shown in FIG. 5C, assume information services network 160 is part of 4-1-1 service (e.g., telephone directory service) and that other device 104 is an automobile OEM navigation system. Access terminal 102 may be used to initiate a call to the 4-1-1 service and allow a user to interact with an operator of the 4-1-1 service. When a listing is identified by the operator, that listing can then be sent (via mobile user content server 150) to access terminal 102 and then transferred to the automobile navigation system.

Although FIGS. 5A-5C show exemplary components of network portion 500, in other implementations, network portion 500 may contain fewer, different, differently arranged, or additional components than depicted in FIGS. 5A-5C. In still other implementations, one or more components of network portion 500 may perform one or more other tasks described as being performed by one or more other components of network portion 500.

Figure 6:
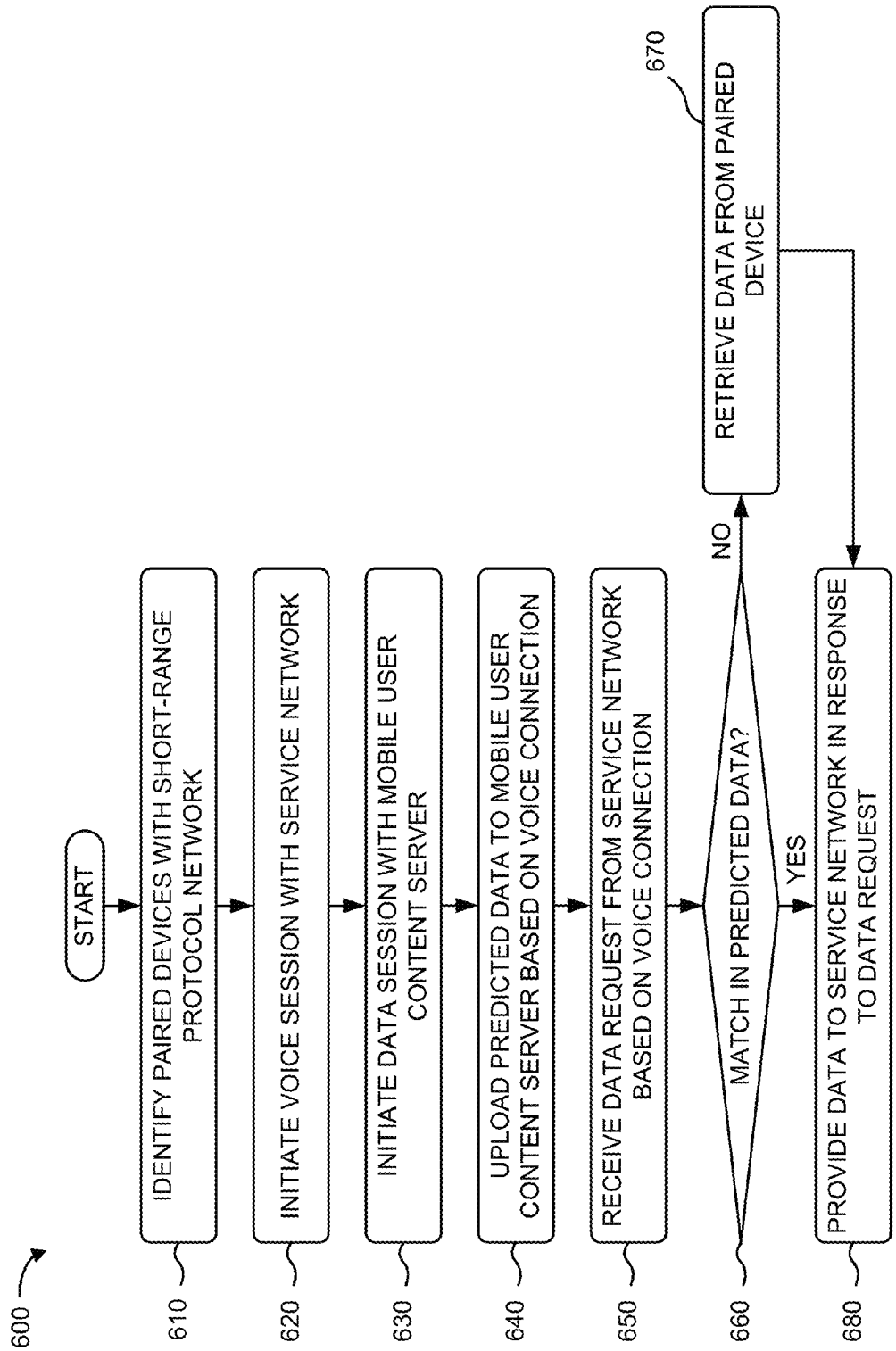

FIGS. 6 and 7 depict flow charts of an exemplary process 600 for the integration of devices in a short-range network with a services network via an access terminal according to implementations described herein. In one implementation, process 600 may be performed by access terminal 102. In other implementations, some or all of process 600 may be performed by another device or group of devices (e.g., communicating with access terminal 102), such as mobile user content server 150.

As illustrated in FIG. 6, process 600 may include identifying paired devices within a short range protocol network (block 610). For example, in implementations described above in connection with FIG. 5A, access terminal 102 may recognize one or more paired devices over a short-range network as shown by reference number 510. Access terminal 102 may use Bluetooth, Wi-Fi, and/or other protocols to identify other device 104 and available information about other device 104.

A voice session may be initiated with a service network (block 620). For example, in implementations described above in connection with FIG. 5A, a user of access terminal 102 may place a call to a telephone number associated with information services network 160. The call may be routed (e.g., via voice network 140) to information services network 160, where the call may be subsequently routed to a service computing device 162 and/or voice unit 164 associated with a particular operator or automated service of information services network 160.

A data session may be initiated with a mobile user content server (block 630) and predicted data may be uploaded to the mobile user content server based on the voice connection (block 640). For example, in implementations described above in connection with FIG. 5A, access terminal 102 may initiate a data connection with mobile user content server 150 and send predicted data 530 via data network 130 during or in advance of establishment of voice connection 520.

A data request may be received from the service network based on the voice connection (block 650). For example, in implementations described above in connection with FIG. 5A, data request 540 may be triggered by an operator or an automated response system (e.g., an interactive voice response system) in conjunction with information services network 160. Data request 540 may include a request from a device within information services network 160 (e.g., service computing device 162) to mobile user content server 150 for particular data from other device 104. Data request 540 may be sent to mobile user content server 150 via data network 130 or another network during or after establishment of voice connection 520.

It may be determined if there is a match in the predicted data (block 660). For example, in implementations described above in connection with FIG. 5A, mobile user content server 150 may determine if mobile user content server 150 has already received information from other device 104 (e.g., via access terminal 102) that is responsive to data request 540.

If there is not a match in the predicted data (block 660—NO), the requested data may be retrieved from the paired device (block 670). For example, mobile user content server 150 may forward the data request to access terminal 102 over the data connection 530 established during initialization of voice connection 520 to retrieve data sufficient to respond to data request 540. If there is a match in the predicted data (block 660—YES), the data may be provided to the service network in response to the data request (block 680). For example, in implementations described above in connection with FIG. 5A, mobile user content server 150 may send data reply 550 to a device (e.g., service computing device 162) associated with information services network 160. Data reply 550 may include some or all of predicted data 530.

Process block 670 may include the process blocks depicted in FIG. 7. As shown in FIG. 7, process block 670 may include forwarding data request from the mobile user content server to the access terminal (block 710) and forwarding data request from the access terminal to a paired device (block 720). For example, in implementations described above in connection with FIG. 5B, mobile user content server 150 may send forwarded data request 552 via data network 130 during or after voice connection 520. Access terminal 102 may then send forward data request 552 to other device 104, as indicated by reference number 554. Forward data request 554 may be sent from access terminal 102 to other device 104 using protocols for short-range network 106.

Data that responds to the access request may be retrieved from the paired device (block 730) and a data request reply may be sent to the mobile user content server (block 740). For example, in implementations described above in connection with FIG. 5B, other device 104 may provide the requested data that was the subject of data request 540. Requested data 556 may be sent from other device 104 to access terminal 102 using protocols for short-range network 106 that are the same or different than those used for forward data request 554. Access terminal 102 may then send reply to data request 558 to mobile user content server 150. In one implementation, reply to data request 558 may be sent via data network 130 during or after voice connection 520. Reply to data request 558 may include requested data 556 from other device 104.

FIG. 8 depicts a flow chart of an exemplary process 800 for the integration of devices in a short-range network with a services network via an access terminal according to another implementation described herein. In one implementation, process 800 may be performed by access terminal 102. In other implementations, some or all of process 800 may be performed by another device or group of devices (e.g., communicating with access terminal 102), such as mobile user content server 150.

As illustrated in FIG. 8, process 800 may include identifying paired devices within a short range protocol network (block 810), initiating a voice session with a service network (block 820), and initiating a data session with a mobile user content server (block 830). For example, in implementations described above in connection with FIG. 5C, for example, access terminal 102 may identify one or more paired devices within short-range network 106, establish a voice session with an information services network 160, and initiate a data session with a mobile user content server 150.

A data response that was generated by the service network based on information from the voice session may be received via the mobile user content server (block 840). For example, in implementations described above in connection with FIG. 5C, resources within or in connection with information services network 160 may be used to identify information necessary to answer a request from the user of access terminal 102 indicated using voice network 140. Data response 560 may then be sent from a device associated with information services network 160 (e.g., service computing device 162) to mobile user content server 150.

Data from the data response may be provided to the paired device (block 850). For example, in implementations described above in connection with FIG. 5C, mobile user content server 150 may the send the data response 560 to access terminal 102 as forward data response 562 via data network 130 during or after voice session 520. Access terminal 102 may then provide the data response as forward data response 564 to other device 104 via short-range network 106.

Systems and/or methods described herein may provide for identifying content stored within a paired device in a short-range wireless network. The identified content may be seamlessly provided to an information services provider by initiating a voice session with the information services provider and, at about the same time, automatically initiating a data session with a mobile user content server associated with the information services provider. Some or all of the identified content may be uploaded to the mobile user content server and provided to the information services provider upon request of the information services provider.

Systems and/or methods described herein may enable an information services provider to use a voice connection with the user of the access terminal and data connection with a short-range wireless device to provide advanced information services. An access terminal may provide a data link between a mobile user content server and another device in local (e.g., short-range) communication with the access terminal. Thus, in addition to voice communication (e.g., with a person or automated system), an information services provider may retrieve data from other devices having a short-range wireless connection with the access terminal that may be beneficial to services provided by the information services provider. Faster data transactions may be achieved by providing predicted data of relevance to the mobile user content server in advance of a request for information from the information services provider.

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, while particular implementations have been provided with respect to other devices 104 being an automobile navigation system, a wide variety of other devices, such as gaming devices, printing devices, portable media players, etc. may be used a one of other devices 104. Further, while particular implementations relating to an automobile navigation system have been described, other navigation systems may be used to provide additional types of data to support enhanced information services, such as notification services for traffic, airport delays, weather conditions, etc. Also, while series of blocks and lines have been described with regard to FIGS. 6-8, the order of the blocks and lines may differ in other implementations. Further, non-dependent blocks and/or lines may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
   receiving, by a server and from a mobile device, predicted data that is predicted by the mobile device to be required by a computing device;
   receiving, by the server and from the computing device, a request for particular data from a device connected to the mobile device via a short-range wireless network;
   determining, by the server, that the predicted data does not include the particular data;
   transmitting, by the server, the request to the mobile device after determining that the predicted data does not include the particular data;
   receiving, by the server and based on the request, the particular data from the mobile device;
   generating, by the server, a reply based on the particular data; and
   transmitting, by the server, the reply to the computing device.

2. The method of claim 1,
   where receiving the request includes:
      receiving the request via a first network,
   where transmitting the reply includes:
      transmitting the reply via a second network, and
   where the first network is different from the second network.

3. The method of claim 1, where the predicted data includes at least one of:
   location information,
   destination information,
   route information, or
   a particular period of time associated with the device connected to the mobile device.

4. The method of claim 1, further comprising:
   receiving, from the computing device, a data response to a data request from the mobile device,
      the data response including information for the device connected to the mobile device; and
   transmitting the data response to the mobile device.

5. The method of claim 1, further comprising:
   establishing a data connection with the mobile device after the mobile device establishes a voice connection with an entity associated with the computing device.

6. The method of claim 1, where the predicted data is based on a telephone number of an entity associated with the computing device.

7. A server comprising:
   one or more processors to:
      receive, from a mobile device, predicted data that is predicted by the mobile device to be required by a computing device,
         the predicted data being from a device connected to the mobile device via a short-range wireless network;
      receive a request from the computing device;
      generate, based on the request, a reply that includes at least a portion of the predicted data;
      transmit the reply to the computing device;
      receive, from the computing device, another request for particular data from the device connected to the mobile device via the short-range wireless network;
      transmit the other request to the mobile device;
      receive, from the mobile device, a response that includes the particular data; and
      transmit the particular data to the computing device.

8. The server of claim 7,
   where the request is for other data, and
   where, when generating the reply, the one or more processors are to:
      determine, based on the request, that the portion of the predicted data includes the other data, and
      generate the reply after determining that the portion of the predicted data includes the other data.

9. The server of claim 7, where, when transmitting the other request to the mobile device, the one or more processors are to:
   determine, based on the other request, that the predicted data does not include the particular data; and
   transmit the other request to the mobile device after determining that the predicted data does not include the particular data.

10. The server of claim 7, where the one or more processors are further to:
    establish a data connection with the mobile device,
       a voice connection being established between the mobile device and an entity associated with the computing device.

11. The server of claim 7, where the predicted data is based on a telephone number of an entity associated with the computing device.

12. The server of claim 7, where the one or more processors are further to:
    receive particular information requested by a user of the mobile device via a voice connection, and
    transmit the particular information to the mobile device.

13. A non-transitory computer-readable medium storing instructions, the instructions comprising:
    one or more instructions that, when executed by at least one processor, cause the at least one processor to:
       receive, from a mobile device and via a data connection, predicted data;
       receive, from a computing device, a request for particular data;
       determine that the predicted data does not include the particular data;
       transmit the request to the mobile device based on determining that the predicted data does not include the particular data;
       receive, from the mobile device, a response that includes the particular data after transmitting the request to the mobile device;
       generate a reply based on the particular data; and
       transmit the reply to the computing device.

14. The non-transitory computer-readable medium of claim 13, where the predicted data is from a device connected to the mobile device via a short-range wireless network.

15. The non-transitory computer-readable medium of claim 13, where the instructions further comprise:
one or more instructions that, when executed by the at least one processor, cause the at least one processor to:
receive, from the computing device, particular information requested by a user of the mobile device via the voice connection, and
transmit the particular information to the mobile device.

16. The non-transitory computer-readable medium of claim 15, where the particular information is for a device connected to the mobile device via a short-range wireless network.

17. The non-transitory computer-readable medium of claim 13, where the instructions further comprise:
one or more instructions that, when executed by the at least one processor, cause the at least one processor to:
establish the data connection with the mobile device after the mobile device establishes a voice connection with an entity associated with the computing device.

18. The non-transitory computer-readable medium of claim 13, where the predicted data is based on a voice connection between the mobile device and an entity associated with the computing device.

19. The non-transitory computer-readable medium of claim 13, where the instructions further comprise:
one or more instructions that, when executed by the at least one processor, cause the at least one processor to:
receive, from the computing device, another request for other data;
determine that the predicted data includes the other data;
generate another reply based on a portion of the predicted data that includes the other data; and
transmit the other reply to the computing device.

20. The non-transitory computer-readable medium of claim 13, where the particular data is from the device connected to the mobile device via the short-range wireless network.

\* \* \* \* \*